G. D. DOHERTY
March 14, 1933. HUMIDIFYING APPARATUS Re. 18,762
Original Filed June 20, 1927 2 Sheets-Sheet 1
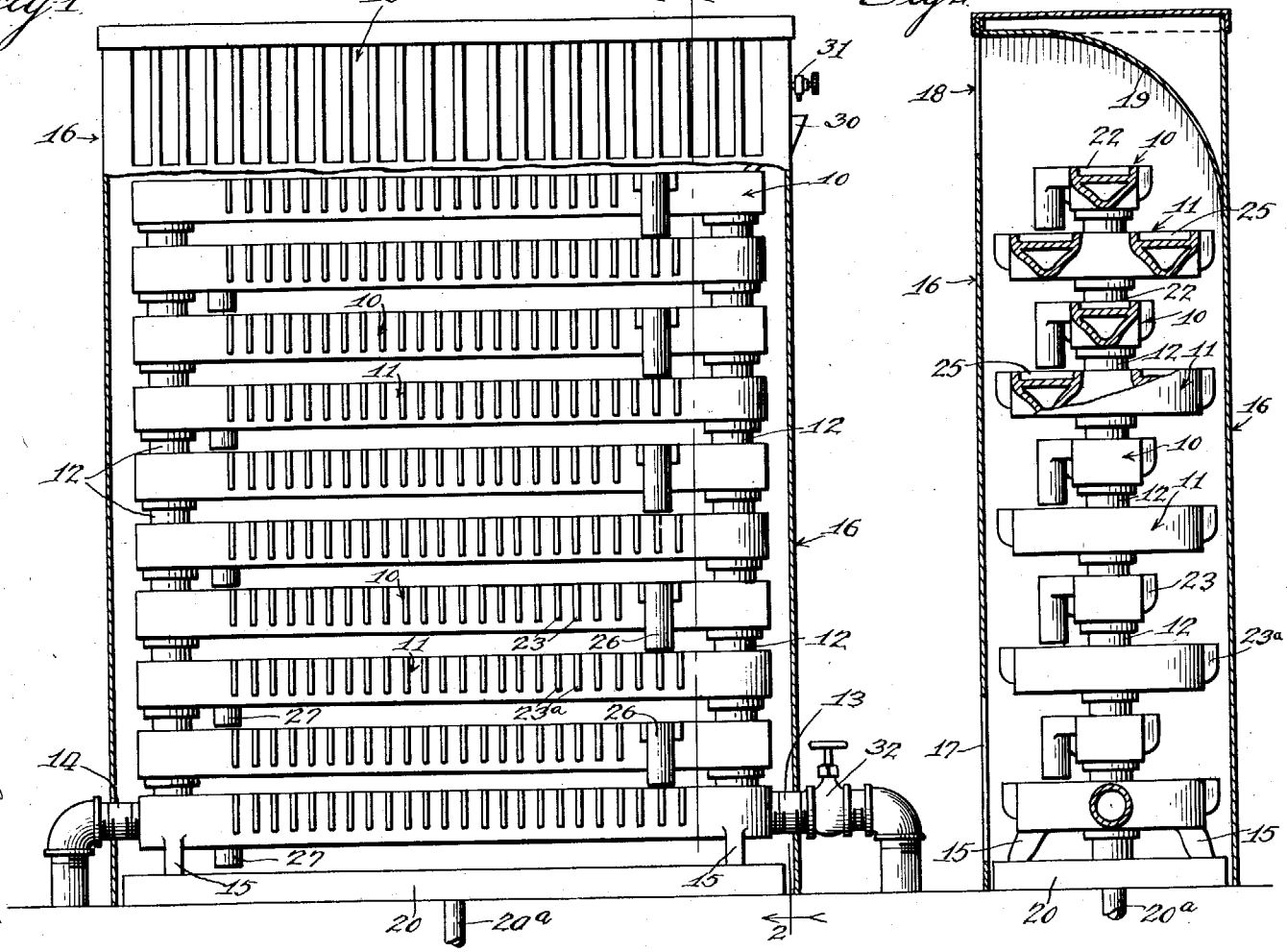
Witness:
Dane S. Magnusson
Inventor:
GEORGE D. DOHERTY
By Jones, Addington, Ames & Seibold
Attys.

G. D. DOHERTY
March 14, 1933. HUMIDIFYING APPARATUS Re. 18,762
Original Filed June 20, 1927 2 Sheets-Sheet 2
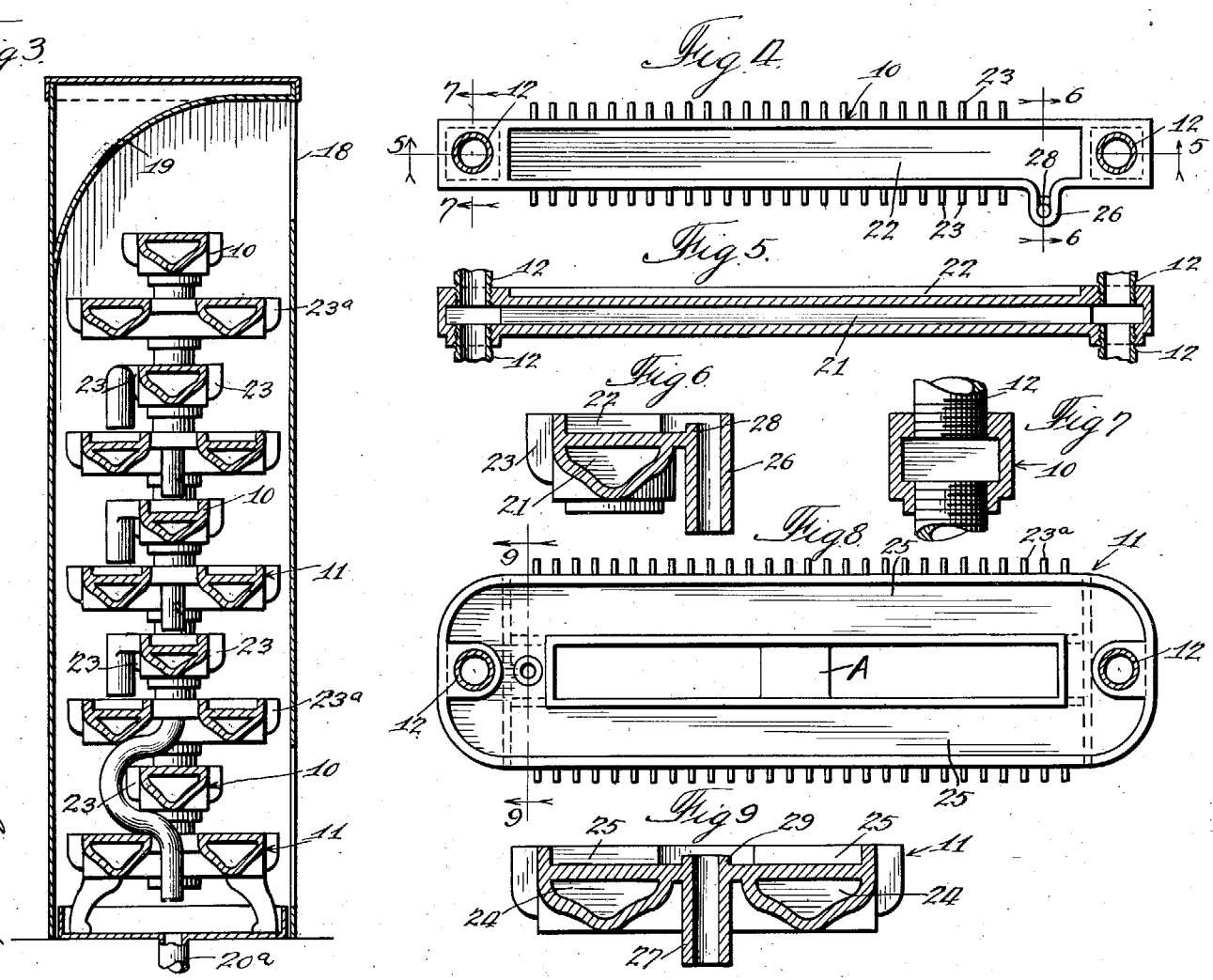
Witness:
Dave Magnusson.
Inventor:
GEORGE D. DOHERTY
By Jones, Addington, Ames & Seibold
Attys.

Reissued Mar. 14, 1933 Re. 18,762

UNITED STATES PATENT OFFICE

GEORGE D. DOHERTY, OF EVANSTON, ILLINOIS, ASSIGNOR TO DOHERTY-BREHM COMPANY, OF MINNEAPOLIS, MINNESOTA, A CORPORATION OF DELAWARE

HUMIDIFYING APPARATUS

Original No. 1,760,976, dated June 3, 1930, Serial No. 199,904, filed June 20, 1927. Application for reissue filed June 3, 1932. Serial No. 615,257.

This invention relates to humidifying apparatus and has special reference to an apparatus for moistening and heating the atmosphere in a room or other enclosure to maintain a desired degree of relative humidity and temperature therein.

More particularly, this invention has reference to an apparatus comprising sections for circulating a heating medium which sections are so constructed and arranged as to accommodate a humidifying medium in close thermal relation with the heating medium for evaporation into the atmosphere in a room or other enclosure to maintain a desired degree of relative humidity and temperature therein.

Heretofore, in order to prevent an undesirable and unhygienic aridity in a house or other building, a supply of vapor has been introduced into the air by means of spraying the water or other liquid on a heating section with which latter the air is caused to contact; by forcing air, which has previously been heated, through a means which latter has been saturated with water or other humidifying medium; or by various other contrivances which require a comparatively great amount of attention in their successful operation.

The present invention provides an efficient means for eliminating the above mentioned inconvenience, for example, a motor or blower is not required for the operation of the apparatus nor is any movable element that needs special attention and periodic inspection connected therewith. The heating sections of my present invention are supplied with a heating medium such as steam or hot water in the ordinary manner as supplied to radiators of the present-day construction. However, the heating sections of this invention are provided with troughs for containing a supply of water or other humidifying medium in order that an efficient thermal conductivity be maintained between the heating medium and the humidifying medium. These sections which provide for both heating and humidifying are so designed and, if separated into component parts, are so assembled in relation to one another that the heated air and humidifying medium are freely circulated within the room or office naturally and without the aid of forced circulating means. At the same time, the heat from the steam, vapor or hot water and the humidity from the humidifying medium are most efficiently employed disseminated within the room or office. As the humidifying medium is vaporized and circulated into the air, the humidified air is replaced by the arid air in the room which latter is likewise humidified by the vapors of the humidifying content and thus a complete cycle of operation is obtained through the apparatus by reason of the latter air losing its humidity and returning to become rehumidified.

One of the objects of this invention is to provide an apparatus of the character indicated for moistening and heating the air in a room or other enclosure whereby the humidifying content has a direct thermal contact with the entire heating supply to maintain a desired degree of relative humidity.

Another object of this invention is to provide an apparatus as indicated above in which the container for the humidifying medium is formed integrally with the heating section.

A further object of this invention is to provide an apparatus as above noted in which the surface of the humidifying agent is fully exposed to the circulation of the air.

A still further object of this invention is to provide an apparatus of the type mentioned above in which the air has a rapid circulation and unrestricted path therethrough to receive the vapors from the humidifying medium and heat from the heating medium.

It is also the object of this invention to provide an apparatus of the type hereinbefore recited in which an improved and efficient radiation is provided for the evaporating and heating surfaces whereby no noises nor other annoying conditions, ordinarily encountered are prevalent.

Other objects and advantages will be apparent from the following description and accompanying drawings forming a part of this specification to which reference may now be had for a more complete understanding of the characteristic features of this invention, in which drawings:

Figure 1 is a front, elevational view of the apparatus showing the casing therefor in section;

Fig. 2 is a side elevational view of Fig. 1 showing a portion thereof in section and being taken on the line 2—2 of Fig. 1;

Fig. 3 is a vertical sectional view of a further embodiment of this invention.

Fig. 4 is a top plan view of one of the heating sections embodied in the apparatus;

Fig. 5 is a central sectional view taken on the line 5—5 of Fig. 4;

Fig. 6 is a vertical sectional view taken on the line 6—6 of Fig. 4;

Fig. 7 is a vertical sectional view taken on the line 7—7 of Fig. 4;

Fig. 8 is a top plan view of another of the heating sections embodied in this invention; and Fig. 9 is a vertical sectional view taken on the line 9—9 of Fig. 8.

Referring now to the drawings and more particularly to Figs. 1 and 2 thereof, one form of humidifier, as embodied in this invention, is shown therein and comprises a group of superposed horizontally extending heating sections 10 and 11. The ends of each adjacent heating section are connected together by means of nipples 12 thereby providing a continuous passageway therethrough. The headers thus formed by these continuous passageways are connected to the heating system, the lower end of one being connected to an inlet conduit 13 and the lower end of the other being connected to an outlet conduit 14.

The lowermost heating section is provided with feet 15 or other suitable extensions, upon which the entire structure rests. These superposed heating sections may be enclosed by means of an open cabinet 16, although this is optional with the purchaser, and not particularly essential. In one form of suitable cabinet the lower end of the front of the cabinet is provided with an opening 17 to admit the arid and unheated air into contact with the heating sections, whereafter the air passes upwardly as it becomes heated and humidified to pass out through the grille 18 at the upper end of the cabinet. In order to facilitate the flow of the heated and humidified air toward the grille 18, a curved baffle plate 19 may extend across the upper rear corner of the cabinet. It will be readily apparent that were this cabinet omitted, the path of the air in the room or other enclosure would have a similar circulation, the dry and unheated air being drawn toward the sections as the humidified and heated air is diffused therefrom. However, the cabinet is, at most times desirable because of the striking appearance to be obtained from an ornamental device of this character.

A drip pan 20 is provided at the bottom of the heating sections to receive any condensate or overflow from the heating sections. The drip pan must necessarily be of a width and length to extend beyond the outermost edges of the heating section and in the drawings, the extensions or feet 15 rest in the bottom of the drip pan in order to conserve space, although it may be desirable to have these feet rest on the outside thereof.

By referring now to the detailed structure of the heating sections as illustrated in Figs. 4 to 9, inclusive, the heating section 10 comprises a casting having a passageway 21 extending therethrough in communication with the aforementioned continuous passageway afforded by means of the nipples 12 interconnecting adjacent heating sections. The heating medium, such as hot water, steam or vapor, is circulated from the inlet header through the passageway 21 to the outlet header. The upper portion of the casting is provided with a recessed portion or trough 22 extending substantially the entire length of the heating section. A humidifying medium, such as water, is provided in the recessed portion 22 to be heated and vaporized by the heating medium circulated through the passageway 21 of the heating section. A plurality of fins 23 may, if desired, be provided on the outer surfaces of the heating section 10 to provide for a greater amount of radiating surface.

The heating section 11, as illustrated in Figs. 8 and 9, comprises a casting of a coil shape having a passageway 24 extending therethrough. The cross-section of each of the two horizontally extending portions of the coil may be the same as the cross-section of the single heating section 10, the two portions being spaced a substantial distance apart. However, as provided in most heating sections of comparatively great lengths, the passageways of the two portions may be connected at a central point as indicated at A to provide for a more efficient circulation of the heating medium. The passageway 24 is in communication with the inlet and outlet headers provided by the nipples 12 interconnecting the adjacent coil sections. The upper surface of the coil is recessed as at 25 to contain the humidifying medium, the recessed portion extending so as to permit the humidifying medium to pass over substantially the entire upper surface of the coil. The radiating surface of the coil shaped heating section may be increased by the fins 23[a] provided on the outer surfaces thereof.

The bottom surface of the coil section 10 is slightly curved and tapers from the outer edges toward a central point thereof. This construction facilitates the flow of the air as it is being heated and humidified. The same construction is provided in the heating section 11 wherein the two horizontally extending portions are similarly curved and have centrally tapering bottom portions.

It is preferable to dispose a single unit 10 centrally of and between each double unit 11 although it is to be understood that this construction may be varied at the will of the manufacturer and that the construction may be adjusted to the various requirements for different conditions in the many enclosures for which it is adapted. It may also be desirable to provide heating sections consisting of three or four units and it is to be understood that this invention is not to be limited to the particular forms shown in the drawings. It is apparent that by staggering the units, a system of baffling is obtained whereby a maximum of efficiency is obtained in transferring heat and humidity to the atmosphere.

In the construction shown in the drawings, the air passes through the opening between the two horizontally extending portions of the double or coil-shaped heating section to contact with the lower surface of the single heating section, and thence around that section to contact with the double unit next above where it is forced between and around the horizontally extending portion as first described.

In order that a common means of supply may be utilized to furnish the humidifying medium to the entire structure, an overflow pipe 26 is provided on the coil section 10 in communication with the recessed portion 22 for permitting the humidifying medium contained therein to be fed to the recessed portion 25 of the heating section 11 next below. Similarly, an overflow pipe 27 is provided in the heating section 11 to permit of the overflow from that section into the heating section 10 next below. The overflow pipe on the lowermost heating section permits its overflow to be fed to the drip pan 20 which latter is connected to the sewer by conduit 20[a]. A lip 28 is provided on the upper end of the overflow pipe 26 of the heating section 10, in order to retain a supply of the humidifying medium in the recess 22, and a similar lip 29 is provided on the upper end of the overflow pipe 27 in order to retain a supply of the humidifying medium in the recessed portion 25 of the heating section 11. It is preferable to arrange the overflow pipes 26 and 27 at opposite ends of their respective heating sections so that an even distribution of the humidifying medium may be obtained.

As a means for supplying the humidifying medium to the coil sections, a source of supply may be contained in a small tank in the upper portion of the cabinet and is permitted to flow therefrom to a receptacle 30 in communication with the recessed portion of the uppermost heating section. The supply to the trough 30 is controlled by a valve 31 which, it will be apparent, may be controlled manually or mechanically. It may be desirable at times to turn off automatically the supply of the humidifying medium to the heating sections when the steam, hot water or other heating medium is shut off from the heating sections. However, for the purpose of this application, it is deemed only necessary to state that the valve 31 controls the supply of water or other humidifying medium contained in a tank to the heating sections. It is also probable that the valve 31 may be connected to a conduit in direct communication with the domestic water supply.

The control of the evaporation may be obtained through either the valve 31 or a valve 32 connected in the inlet supply conduit 13. With reference to the last mentioned control, by regulating the opening through the valve 32, more or less heat is permitted to flow to the heating sections and, for example, if more heat is demanded, the air passing over the heating sections is heated to a comparatively great degree and it has more capacity for containing the vapor emitted from the heating sections than if it were heated to a lesser degree. On the other hand, should a comparatively small supply of water or other humidifying medium be permitted to pass from the valve 31, it will be apparent that a lesser amount of vapor could be obtained by the atmosphere in passing over the heating section.

It will be noted, particularly, that because of the recessed portions 22 and 25 being extended over the upper surfaces of the heating sections, the entire surface of the humidifying medium is exposed to the circulation of the air and that this humidifying medium is in a substantially direct thermal contact with the entire content of the heating medium, the heat from the heating medium being conducted through the metal and the latter being in contact with the humidifying medium. It will also be noted that because of the lack of mechanical contrivances, such as are usually employed in humidifiers, there will be a lack of the noises accompanying the same, which is a very desirable condition.

By referring now to Fig. 3 of the drawings, a modified form of the present invention is shown which is used particularly when steam is employed as the heating medium. In this construction, the arid and unheated air is first heated to increase its capacity for carrying moisture, whereafter moisture is introduced to the air to be finally superheated before passing into the room or other enclosure. As a means for accomplishing the aforesaid, several of the lower heating sections are not provided with the usual recesses for containing the humidifying agent and will hereafter be referred to as dry sections. Likewise several of the uppermost heating sections are dry sections. The intermediate heating sections are provided with recessed portions for containing the humidifying agent as in the preceding form of this invention. The arid and unheated air passes over the dry sections to be heated, from thence to the wet sections where vapor is introduced into the air, and finally over the dry sections at the top where the humidified air is superheated before passing into the room. This construction will avoid free hot vapor from entering the room which, if sufficiently hot and saturated, will fog the room and may have a scalding effect. The supply of water or other humidifying means in this instance will be led to the uppermost of the wet sections whereafter the overflow therefrom will pass downwardly into the succeeding wet heating sections and finally to the drip pan which latter is connected to the sewer. The remaining elements of this structure are similar with the structure as hereinbefore described.

While several embodiments of this invention are herein shown and described, it is to be understood that the same is not to be limited to these specific structures since various modifications may occur to those skilled in the art without departing from the spirit and scope of this invention, and it is therefore desired that the same be limited only by the showing of the prior art and the scope of the appended claims.

I claim:

1. A device of the character described comprising a plurality of spaced and superposed heating sections connected to one another for circulating a heating medium therethrough, sections having a smaller number of heating units being alternately disposed with sections having a greater number of heating units and the heating units of said superposed sections being staggered relatively to one another for circulating air around said heating units, and means on each heating unit containing a humidifying medium for imparting humidity to the heated air.

2. A device of the character described comprising a plurality of superposed heating sections that alternately comprise a smaller and a greater number of heating units for circulating a heating medium therethrough, and an open trough on each of said units for containing a humidifying medium, said heating sections being spaced from one another and the units of adjacent sections being disposed in staggered relation with respect to one another to direct the air along a tortuous path through said superposed sections whereby said air may receive an efficient transmission of heat and humidity thereto.

3. In a device of the character described, a plurality of superposed heating sections alternately having a smaller and a greater number of passageways therethrough for circulating a heating medium, said heating sections having a greater number of passageways being provided with open spaces therebetween, a casing open to the atmosphere for housing said heating sections, the passageways in the said heating sections having the smaller number of passageways being disposed in staggered relation to the passageways in the said heating sections having the greater number of passageways, certain of the intermediately disposed sections having recesses on their upper surfaces for containing a humidifying medium whereby the air is preheated before moisture is introduced thereinto and superheated thereafter.

4. A combined air humidifier and heat radiator comprising a plurality of spaced superposed heating sections connected to one another to allow a heating medium to flow therethrough, alternate sections having a greater number of heating units than the intermediate sections and said alternate sections at least having open spaces between the heating units thereof, said units of the superposed adjacent sections being arranged in staggered relation to one another to provide a tortuous passageway for the natural circulation of the air through and around said heating sections, and open troughs formed on the upper faces of some of said units for holding a humidifying medium that is imparted to the heated air as it circulates and through said spaced heating sections.

5. A combined air humidifier and heat radiator comprising a plurality of spaced superposed heating sections connected to one another to allow a heating medium to flow therethrough, alternate sections having spaced heating units with an open space therebetween, the heating units of the superposed sections being arranged in staggered relation to one another in order to provide a tortuous passageway for the circulation of the air around said heating units and through the said open spaces formed in the alternate heating sections, open troughs formed on the upper faces of some of said heating units for holding a humidifying medium that may be imparted to the heated air as it circulates, overflow means from the troughs, means for maintaining a minimum level of humidifying medium in each of said troughs, and means for supplying a humidifying medium to the troughs.

6. In a device of the character described, a plurality of superposed heating sections having passageways therethrough for circulating a heating medium, a casing open to the atmosphere for housing said sections, and means on a plurality of intermediately disposed heating sections only for containing a humidifying medium whereby air is preheated before moisture is introduced thereinto and is superheated thereafter.

7. In a device of the character described, a circuitous hollow casting comprising spaced hollow chambers with an open space between adjacent chambers which are connected together at their ends, said chambers allowing for circulating a heating medium, said casting having a continuous exposed recessed portion extending over the entire upper surface thereof for containing a humidifying medium.

8. In a device of the character described, a plurality of superposed spaced heating sections alternately comprising a smaller and a greater number of units for circulating a heating medium, said units of alternate sections being spaced from one another and being disposed in staggered relation to the units of the adjacent sections, means on each unit for containing a humidifying medium, said units having the lower portions thereof substantially V-shaped for directing the flow of air upwardly in contact with the units of the adjacent sections.

9. In a device of the character described, a plurality of superposed and spaced heating sections comprising horizontally extending hollow units connected together for circulating a heating medium through said units, sections having a greater number of units alternating with sections having a lesser number of units and said units of adjacent sections being staggered with respect to each other, said sections having exposed recessed portions thereon for containing a humidifying medium.

10. In a device of the character described, a plurality of superposed spaced heating sections comprising horizontally extending hollow units connected together for circulating a heating medium, a casing open to the atmosphere for housing said sections, alternate sections having a greater number of units than the intermediate sections, said sections having exposed recessed portions thereon for containing a humidifying medium, the units of each alternate section being arranged in staggered vertical relation to the units of the intermediate sections whereby air is passed upwardly through the superposed sections in a tortuous path thereby receiving an efficient transmission of heat and humidity thereto.

11. In a device of the character described, a plurality of superposed spaced hollow heating sections alternate ones of which contain a different number of heating units than the intermediate ones and said sections being so arranged that said units thereof are disposed in a staggered vertical relation to each other, said units providing means for circulating a heating medium therein and each section having a recessed portion on the upper surface for containing a humidifying medium, an overflow conduit formed integrally with each of said sections in communication with said recessed portion to permit the humidifying medium to overflow from the higher to the lower of said recessed portions of the castings, and a lip adjacent the edge of each of said overflow conduits to retain a supply of said humidifying medium in each of said recessed portions.

12. In a device of the character described, a hollow casting for circulating a heating medium comprising a plurality of spaced horizontally extending hollow members connected together at their ends and having an open space between adjacent hollow members to form a passageway, said casting having an exposed recessed portion for containing a humidifying medium.

13. In a device of the character described, a hollow casting for circulating a heating medium comprising a plurality of spaced horizontally extending hollow members connected together at their ends and having an open space between adjacent members to form a passageway, each of said members having an exposed recessed portion thereon for containing a humidifying medium and said recessed portions being intercommunicating.

14. In a device of the character described, a hollow casting for circulating a heating medium comprising a plurality of spaced horizontally extending hollow members connected together at their ends and having an open space between adjacent members to form a passageway, each of said members having an exposed recessed portion thereon for containing a humidifying medium and said recessed portions being intercommunicating, said casting having an aperture extending therethrough communicating with said recessed portions, and a lip bounding said aperture at the upper end thereof, said lip being of a desired height for maintaining a minimum level of the humidifying medium.

15. A combined air humidifier and heat radiator comprising a plurality of spaced heating sections some of which have a larger number of heating units than others and the sections having a larger number of heating units being alternated with the other sections to form the assembled structure, the units of those sections possessing the larger number of heating units being speced from one another to provide open spaces therebetween and said heating sections possessing a larger number of heating units being so positioned with respect to said other heating sections that said units thereof are in staggered relation to one another to provide a tortuous passageway for the circulation of the air through the radiator, open troughs formed on the upper faces of said heating units for holding a humidifying medium that is imparted to the heated air as it circulates around said heating sections, overflow means for said troughs, means for maintaining a minimum level of humidifying medium in each trough, and means for supplying a humidifying medium to the troughs.

16. A combined air humidifier and heat radiator comprising a plurality of spaced and superposed heating sections connected to one another for circulating a heating medium therethrough, alternate sections at least having a plurality of heating units that are spaced from one another to provide open spaces therebetween and the heating units of said superposed sections being staggered relatively to one another to provide a tortuous passage for the natural circulation of the air through and around said heating sections, and open troughs formed on the upper portions of said sections for holding a humidifying medium that is imparted to the heated air as it circulates around and through said heating sections.

17. In a device of the character described, a plurality of superposed hollow heating sections connected together for circulating a heating medium therethrough, humidifying means associated with some of said heating sections, and a casing open to the atmosphere for housing said sections, at least the uppermost of said heating sections being devoid of humidifying means so as to dry out substantially the excess free moisture from the heated and humidified air rising in said casing and discharging therefrom.

18. In a device of the character described comprising a plurality of superposed heating sections connected together for circulating a heating medium therethrough, a casing open to the atmosphere for housing said sections, and means associated with some of said sections for imparting humidity to the heated air as it rises within said casing, and means for drying out substantially the excess free moisture from the heated and humidified air that discharges from said casing.

19. In a device of the character described comprising a plurality of adjacent heating sections connected together for circulating a heating medium therethrough, means associated with some of said heating sections for imparting humidity to the air heated by said sections, and means for increasing the temperature of the heated and humidified air beyond that which this mixture possesses immediately after being humidified.

20. A combined air humidifier and heat radiator comprising a plurality of adjacent hollow heating sections connected together for circulating a heating medium therethrough, a casing open to the atmosphere for housing said sections, means for imparting humidity to the heated air rising from said heating sections, and an additional heating section for increasing the temperature of the heated and humidified air beyond that which the mixture possesses after being humidified so as to avoid an excess of free moisture in the mixture where it discharges from said casing.

21. A combined air humidifier and heat radiator comprising a plurality of superposed hollow heating sections connected together for circulating a heating medium therethrough, some of said sections having recessed portions on their upper faces for containing a humidifying medium that is vaporized and imparted to the heated air as it rises, at least the uppermost heating section being devoid of any humidifying means.

22. In a combined air humidifier and heat radiator comprising a plurality of superposed heating sections that are hollow and connected together to circulate a heating medium therethrough, at least some of said sections being provided with an open space extending therethrough and an exposed recessed portion on the upper face thereof for holding a humidifying medium, said sections being assembled to provide a tortuous passageway for the natural circulation of the air through said open spaces whereby it may receive an efficient transfer of heat and humidity thereto.

23. In a combined air humidifier and heat radiator comprising a plurality of superposed heating sections that are hollow and connected together to circulate a heating medium therethrough, at least some of said sections being provided with an open space extending therethrough and an exposed recessed portion on the upper face thereof for holding a humidifying medium, and means for ensuring the maintenance of a minimum level of humidifying medium in said recessed portions, said sections being assembled to provide a tortuous passageway for the natural circulation of the air through said open spaces whereby it may receive an efficient transfer of heat and humidity thereto.

24. A combined air humidifier and heat radiator comprising a plurality of superposed heating sections connected together for circulating a heating medium therethrough, some of said sections having associated therewith and in close thermal relation trough portions for containing a humidifying medium that is vaporized by the heat developed in the associated heating sections, and means for maintaining a minimum level of humidifying medium in said trough portions, said trough portions being spaced and offset laterally from each other so that in assembled relation the humidified and heated air is allowed to rise unobstructedly therefrom, and a casing open to the atmosphere for enclosing said sections.

In testimony whereof, I have subscribed my name this 2nd day of June, 1932.

GEORGE D. DOHERTY.